United States Patent
Song et al.

(10) Patent No.: US 8,787,234 B2
(45) Date of Patent: Jul. 22, 2014

(54) MULTICASTING WITHIN A WIRELESS COMMUNICATIONS SYSTEM

(75) Inventors: Bongyong Song, San Diego, CA (US); Harleen Gill, San Diego, CA (US); Mehmet Gurelli, San Diego, CA (US); Rashid Ahmed Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 12/489,767

(22) Filed: Jun. 23, 2009

(65) Prior Publication Data

US 2010/0322131 A1 Dec. 23, 2010

(51) Int. Cl.
*H04H 20/71* (2008.01)
*H04L 12/28* (2006.01)

(52) U.S. Cl.
USPC .......................................... 370/312; 370/390

(58) Field of Classification Search
USPC ........... 370/312, 390, 395.2, 395.4, 412, 464, 370/465
See application file for complete search history.

(56) References Cited

U.S. PATENT DOCUMENTS

| | | | |
|---|---|---|---|
| 7,035,657 B2 * | 4/2006 | Chen et al. ................... | 455/518 |
| 7,835,761 B2 | 11/2010 | Gill et al. | |
| 8,364,192 B2 * | 1/2013 | Ghaus et al. .................. | 455/519 |
| 2004/0081111 A1 * | 4/2004 | Bae et al. ...................... | 370/316 |
| 2007/0049314 A1 * | 3/2007 | Balachandran et al. ....... | 455/518 |
| 2007/0153719 A1 * | 7/2007 | Gopal ........................... | 370/328 |
| 2007/0223523 A1 * | 9/2007 | Montpetit et al. ............. | 370/465 |
| 2007/0281722 A1 * | 12/2007 | Gao ............................... | 455/518 |
| 2009/0080363 A1 | 3/2009 | Song et al. | |
| 2010/0142428 A1 * | 6/2010 | Song ............................ | 370/312 |

FOREIGN PATENT DOCUMENTS

| | | |
|---|---|---|
| CN | 1669341 A | 9/2005 |
| EP | 1926235 | 5/2008 |
| JP | 2006522569 A | 9/2006 |
| JP | 2006526313 A | 11/2006 |
| JP | 2008522510 A | 6/2008 |
| WO | WO2004028174 | 4/2004 |
| WO | WO2004098094 A1 | 11/2004 |
| WO | WO2008130772 A1 | 10/2008 |
| WO | WO2009123920 | 10/2010 |

OTHER PUBLICATIONS

Partial International Search Report—PCT/US2010/039475—International Search Authority, European Patent Office, Oct. 15, 2010.
International Search Report and Written Opinion—PCT/US2010/039475—ISA/EPO—Dec. 1, 2010.

* cited by examiner

*Primary Examiner* — Warner Wong
(74) *Attorney, Agent, or Firm* — Michael F. Taveira

(57) ABSTRACT

An access network determines to transmit multicast messages on a downlink shared channel. The access network receives a multicast registration message and a traffic channel request from at least one access terminal. The access network assigns a traffic channel to the at least one access terminal, and transmits the multicast messages on the downlink shared channel. In another example, the access network can determine a channel type upon which the support a multicast session, can indicate the channel type selection to the at least one access terminal in an announce message and can then transmit the multicast messages for the multicast session on the selected channel type. The at least one access terminal receives the announce message, requests a traffic channel and receives a traffic channel assignment, registers to the multicast session and monitors the downlink shared channel for multicast messages.

29 Claims, 14 Drawing Sheets

MULTICASTING WITHIN A WIRELESS COMMUNICATIONS SYSTEM

BACKGROUND OF THE INVENTION

1. Field of the Invention

Embodiments of the present invention are directed to multicasting within a wireless communications system and more particularly to multicasting to a plurality of access terminals over a dynamically selected downlink channel within the wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

An access network determines to transmit multicast messages on a downlink shared channel. The access network receives a multicast registration message and a traffic channel request from at least one access terminal. The access network assigns a traffic channel to the at least one access terminal, and transmits the multicast messages on the downlink shared channel. In another example, the access network can determine a channel type upon which the support a multicast session, can indicate the channel type selection to the at least one access terminal in an announce message and can then transmit the multicast messages for the multicast session on the selected channel type. The at least one access terminal receives the announce message, requests a traffic channel and receives a traffic channel assignment, registers to the multicast session and monitors the downlink shared channel for multicast messages.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
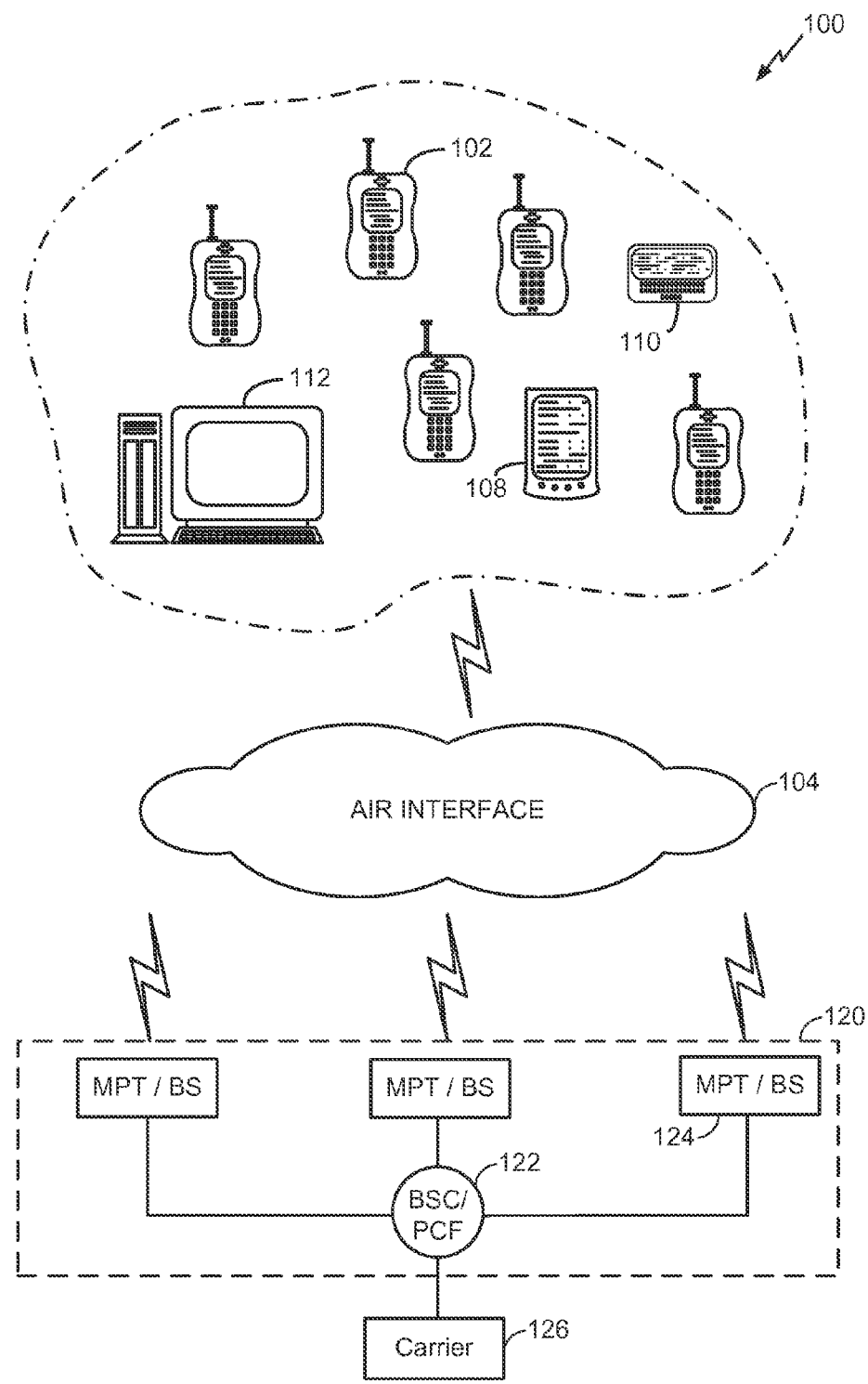
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS124 by a network, the Internet and/or PSTN for data transfer and/or voice information. The MPT/BS124 can broadcast data messages wirelessly to the access terminals, such as cellular telephone 102. The MPT/BS124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS124 may be collapsed into a single "hybrid" module having the functionality of both the BSC/PCF 122 and the MPT/BS124.

Figure 2:
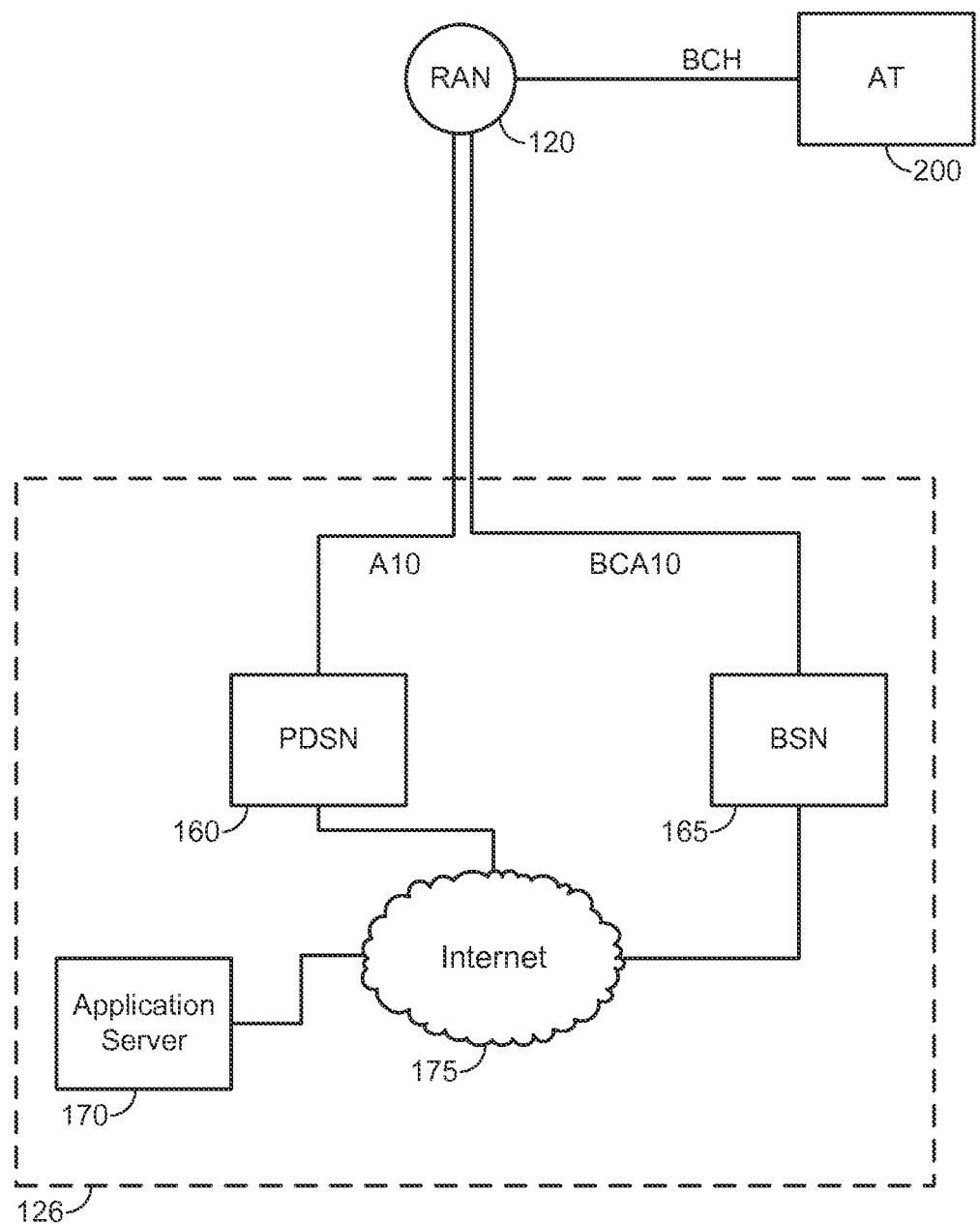
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
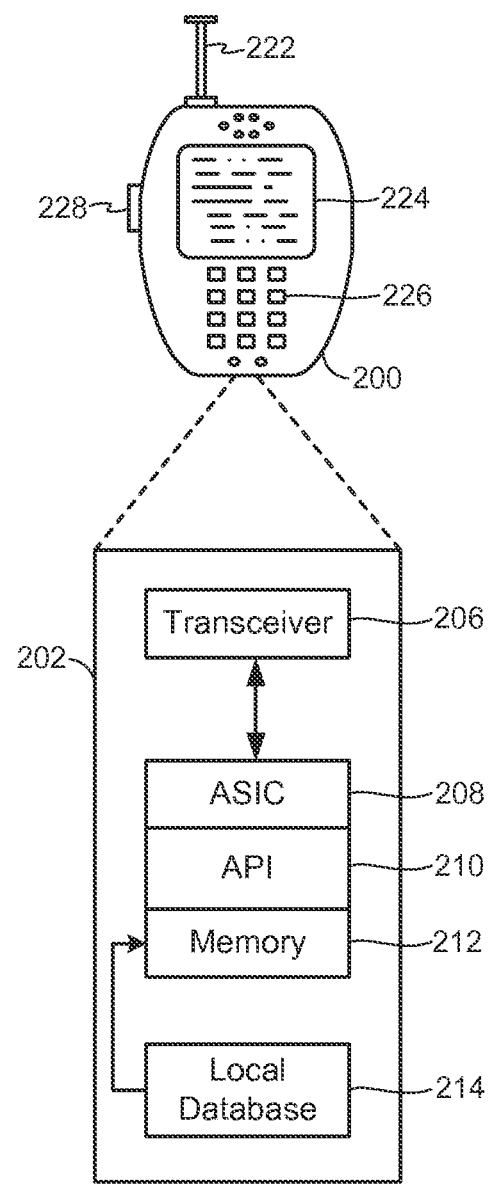
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Below, a description of multicast call-setup for multicast sessions that are carried on a downlink broadcast channel (BCH) in both target and supporting sectors will be described, followed by a description of multicast call-setup for multicast sessions that are carried on a downlink control channel (CCH) in one or more target sectors (e.g., but not necessarily in supporting sectors). As used herein, a target sector is any sector within a wireless communications system, having (or expected to have) at least one multicast group member, that carries a multicast flow for a given multicast session, and a supporting sector is any sector within the wireless communications system, that is not expected to have multicast group members, and also carries the multicast flow (e.g., to enable soft combining in target sectors for high-data rate multicast communications). Target and supporting sector behavior is discussed in more detail within co-pending U.S. patent application Ser. No. 12/212,505, entitled "MULTICAST COMMUNICATIONS WITHIN A WIRELESS COMMUNICATIONS NETWORK", filed on Sep. 17, 2008, assigned to the assignee hereof, and expressly incorporated by reference herein in its entirety.

Figure 4A:
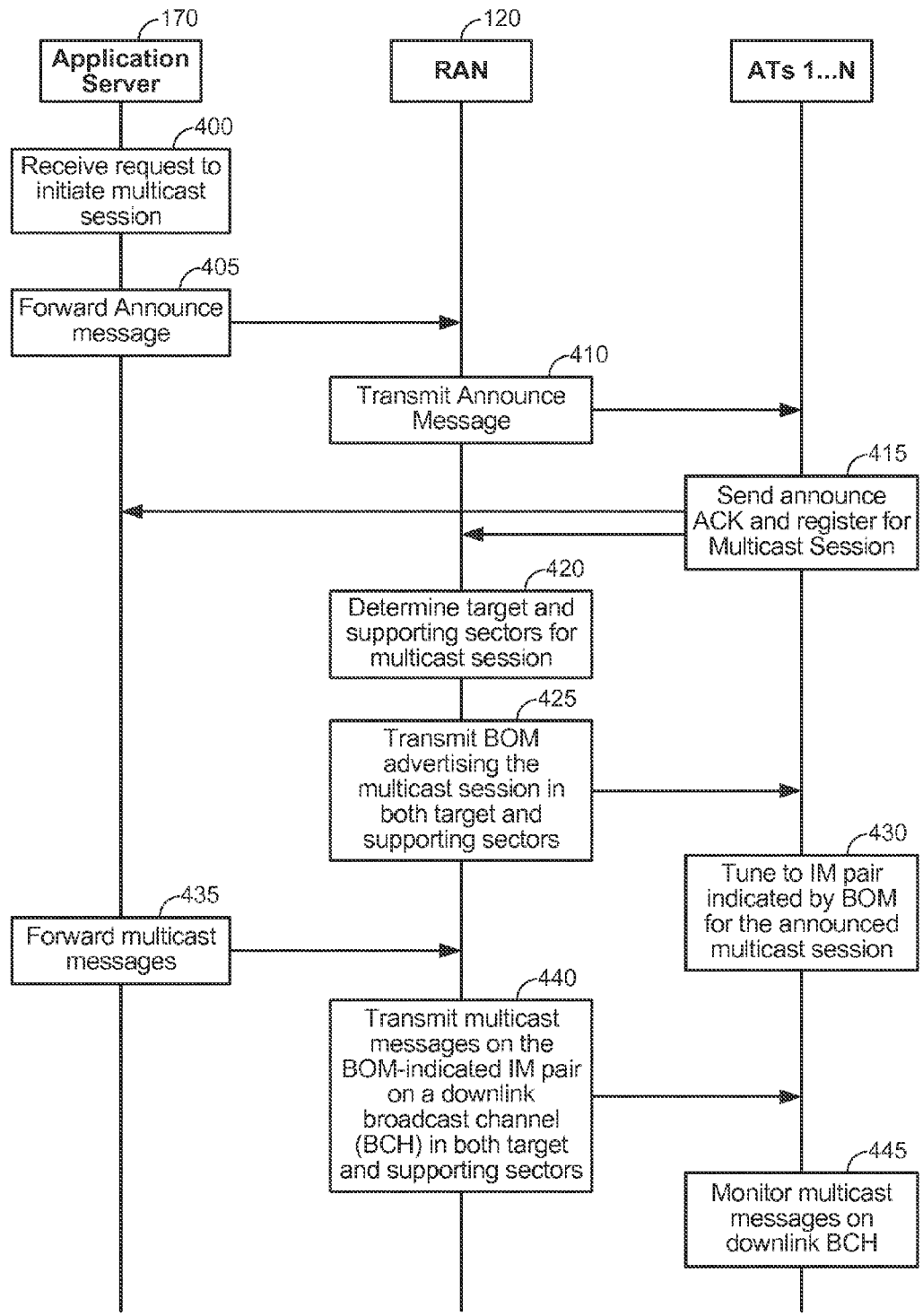
FIG. 4A illustrates a multicast call-setup process for a multicast session to be carried on a downlink broadcast channel (BCH) in both target and supporting sectors according to an embodiment of the present invention.

Accordingly, FIG. 4A illustrates a multicast call-setup process for a multicast session to be carried on a downlink BCH in both target and supporting sectors according to an embodiment of the present invention. Referring to FIG. 4A, in 400, the application server 170 (e.g., a Qchat or Push-to-Talk (PTT) server) receives a request to initiate a multicast session (e.g., from a PTT initiator, not shown). In 405, the application server 170 forwards an announce message to the RAN 120 for transmission to access terminals ("multicast group members", e.g., ATs 1 . . . N) that belong to a multicast group of the multicast session. For example, the application server 170 can forward the announce message to the RAN 120 through the BSN 165 via a BCA10 connection. In 410, the RAN 120 receives the announce message over the BCA10 connection and transmits the announce message to ATs 1 . . . N over the air interface 104 (e.g., as a data-over-signaling (DOS) message addressed to the multicast group on the downlink CCH, via a standard paging of ATs 1 . . . N, etc.). ATs 1 . . . N receive the announce message and one or more of ATs 1 . . . N register for the multicast session, 415 (e.g., by transmitting a BCMC-SFlowRegistration message) and send an announce acknowledgment (ACK) that the RAN 120 forwards to the application server 170.

Figure 4B:
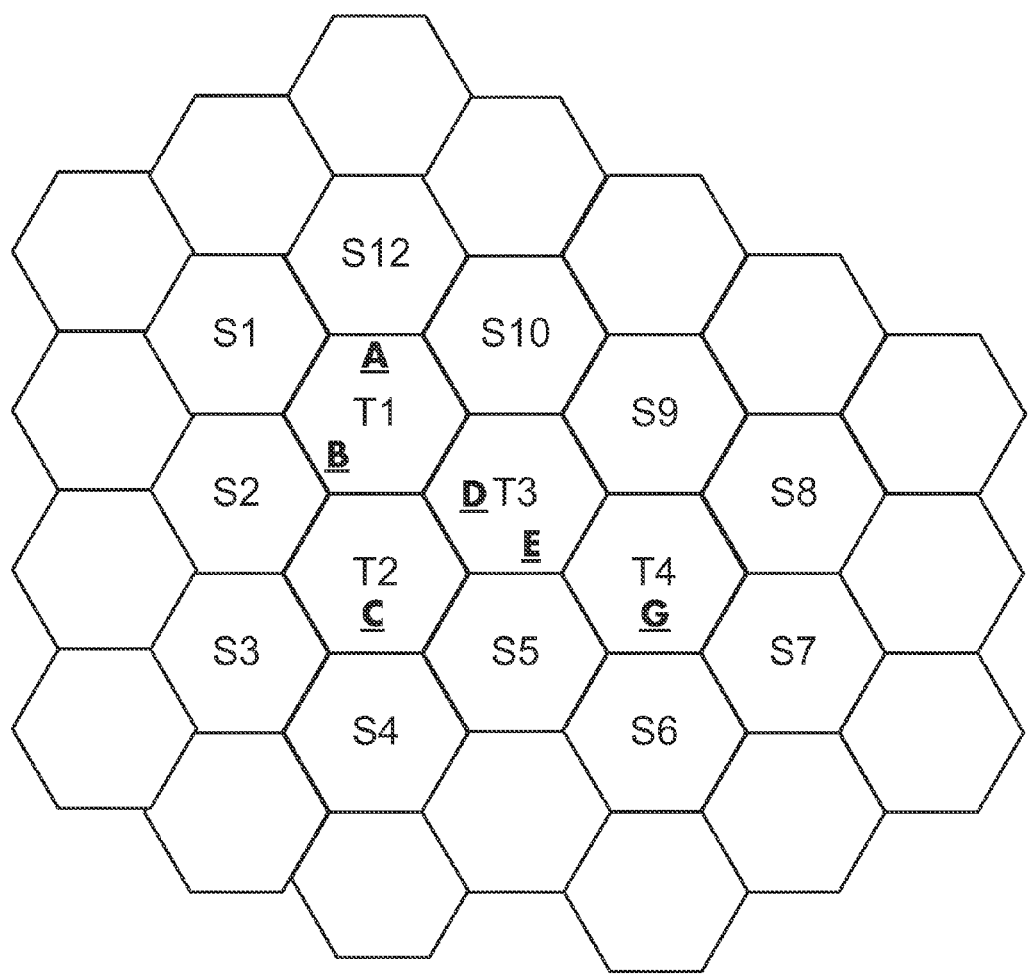
FIG. 4B illustrates a cluster formed during the process of FIG. 4A.

Based at least in part on the registrations received from ATs 1 . . . N, the RAN 120 determines the initial target and supporting sectors for the multicast session, 420. FIG. 4B illustrates an example cluster (i.e., a set of target and supporting sectors) that may be formed in 420 of FIG. 4A. As shown, FIG. 4B assumes that ATs A . . . G have registered for the multicast session, that ATs A . . . G reside in target sectors T1 through T4, respectively, and that target sectors T1 through T4 are supported by supporting sectors S1 through S12. Cluster origination is described in greater detail within the above-incorporated co-pending patent entitled "MULTICAST COMMUNICATIONS WITHIN A WIRELESS COMMUNICATIONS NETWORK".

The RAN 120 transmits a scheduling message (e.g., a broadcast overhead message (BOM)) in the target and supporting sectors, 425. For example, the BOM can include an advertisement of the announced multicast session, along with information instructing ATs 1 . . . N on how to tune to the multicast session on the downlink BCH (e.g., an interlace-multiplex (IM) pair on the downlink BCH upon which multicast messages for the multicast session are to be transmitted). In a further example, BOMs transmitted in target sectors are configured to suppress subsequent AT registrations (e.g., to reduce traffic, except for when the RAN 120 wants to confirm the status of the target sectors), and BOMS transmitted in supporting sectors are configured to prompt AT registrations (e.g., so that the RAN 120 can transition the supporting sector to a target sector, as discussed below in greater detail). Accordingly, the ATs 1 . . . N that have received the BOM tune to the indicated IM pair and monitor for the multicast messages, 430.

In 435, after the application server 170 receives a first announce ACK for the multicast session, the application server 170 begins forwarding multicast messages (e.g., multicast media messages, such as video, audio, text, etc.) to the RAN 120 via the BSN 165 over the BCA10 connection for transmission to ATs 1 . . . N. In 440, the RAN 120 receives the multicast messages over the BCA10 connection and transmits the multicast messages to ATs 1 . . . N over the air interface 104 on the BOM-indicated IM pair of the downlink BCH, in both the target and supporting sectors. The ATs 1 . . . N that have tuned to the BOM-indicated IM pair of the downlink BCH receive and decode the multicast messages, 445.

As will be appreciated by one of ordinary skill in the art, transmitting multicast messages in supporting sectors to be used for soft combining for access terminals within the target sectors helps the access terminals decode high-data rate broadcasts or multicasts. However, if the multicast has a relatively low-data rate, the access terminals may not necessarily need to soft combine with the supporting sector transmission to decode the multicast successfully. Also, if multicast group members are not geographically densely located (e.g., there are not a high number of multicast group members in any particular target sector), then the potentially large number of supporting sectors may decrease an overall spectral efficiency because many sectors are transmitting redundant information to reach only a few local multicast group members. Also, as mentioned above, after the RAN 120 receives a forwarded multicast message for transmission, the RAN 120 waits for the BOM-indicated IM pair on the downlink BCH for the transmission. Thus, delay or lag is introduced for the duration the RAN 120 waits before the transmission on a next IM pair.

Accordingly, embodiments of the present invention wherein supporting sectors need not be used and a multicast session is carried on a downlink control channel (CCH) instead of the downlink BCH will now be described in greater detail with respect to FIGS. 5A-5B. While embodiments of the invention are described below with respect to carrying the multicast session on the downlink CCH, it will be appreciated that, in other embodiments of the invention, the multicast session can be carried on any downlink shared channel, and not necessarily on the downlink CCH.

Figure 5A:
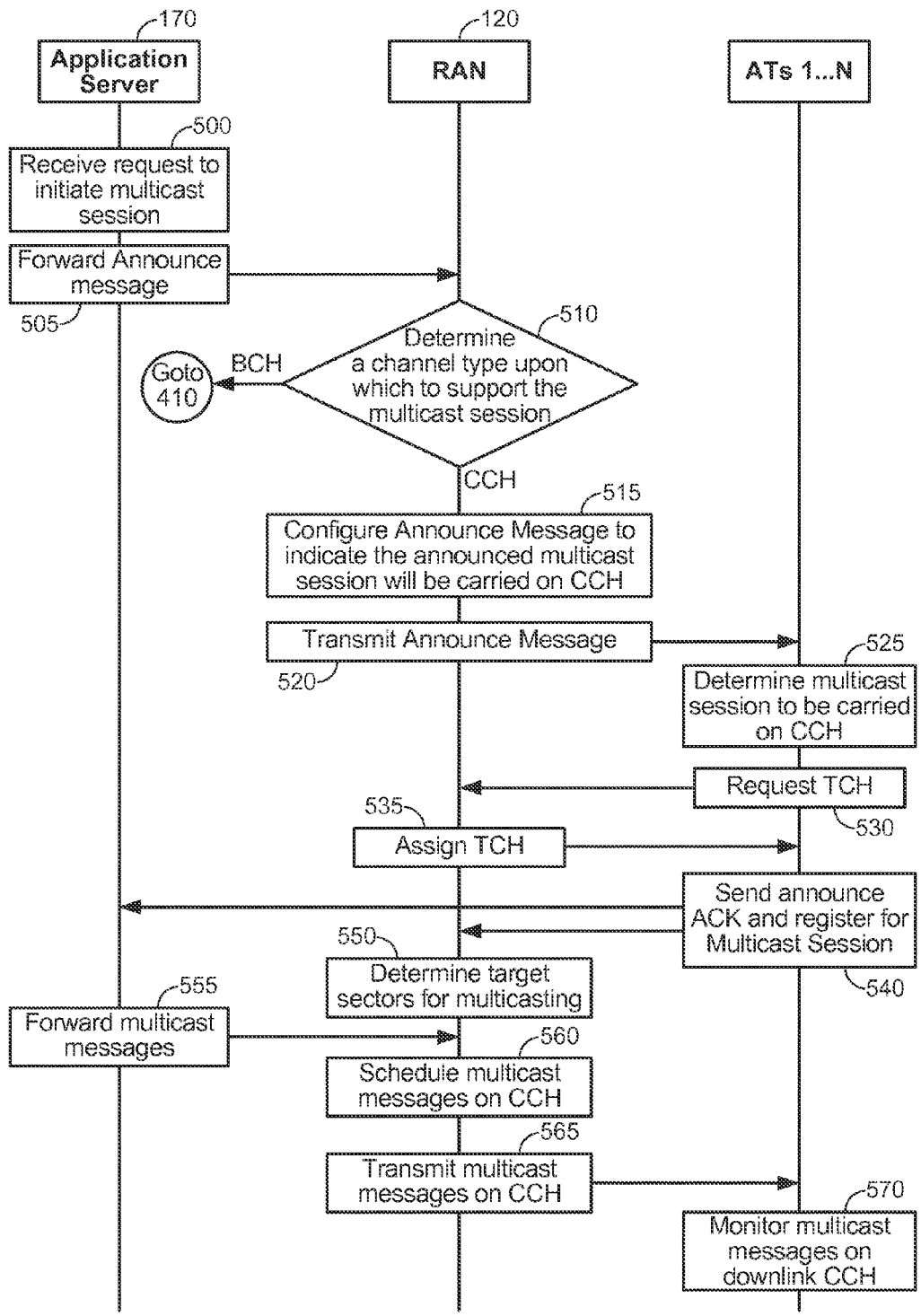
FIG. 5A illustrates a multicast call-setup process for a multicast session to be carried on a downlink control channel (CCH) in target sectors according to an embodiment of the present invention.

Accordingly, FIG. 5A illustrates a multicast call-setup process for a multicast session to be carried on a downlink CCH in one or more target sectors according to an embodiment of the present invention. Referring to FIG. 5A, in 500, the application server 170 (e.g., a Qchat or Push-to-Talk (PTT) server) receives a request to initiate a multicast session (e.g., from a PTT initiator, not shown). In 505, the application server 170 forwards the announce message to the RAN 120 for transmission to ATs 1 ... N that belong to a multicast group of the multicast session. For example, the application server 170 can forward the announce message to the RAN 120 through the BSN 165 via a BCA10 connection.

In 510, the RAN 120 receives the announce message over the BCA10 connection and determines a channel type (e.g., BCH, CCH, etc.) upon which to support the multicast session associated with the announce message. For example, the RAN 120 can determine between the downlink CCH and BCH based at least in part upon estimated locations of the multicast group members for the announced multicast session. The locations of the multicast group members can be tracked during operation of the wireless communications system 100, and the RAN 120 can maintain a location table that indicates the last known position of the multicast group members based on route update reports received from the multicast group members. Location tracking of access terminals is discussed in more detail within U.S. patent application Ser. No. 12/212,929, entitled "TRACKING LOCATIONS OF MULTICAST GROUP MEMBERS WITHIN A WIRELESS COMMUNICATION SYSTEM", filed on Sep. 18, 2008, assigned to the assignee hereof, and expressly incorporated by reference herein in its entirety.

Accordingly, in this example, the information contained within the location table can be used to decide between multicasting on the downlink BCH or CCH. In an example, if the number of expected multicast group members within a given sector or other geographic partition is above a threshold, then the BCH-based multicasting discussed with respect to FIG. 4A-4B can be implemented (e.g., to reduce a likelihood of overloading the CCH), in an example, and the process may advance to 410 of FIG. 4A. In another example, if the number of expected multicast group members within the given sector or other geographic partition is not above a threshold, then the process may advance to 515 and the CCH may be used.

As will be appreciated, the CCH has a lower data rate (e.g., 76.8 kbps) then the BCH (e.g., 307.2 kbps). Thus, in another example, the determination of 510 can be based at least in part upon a data rate associated with the multicast session. For example, if the expected data rate of the multicast session is above a data rate threshold, then the RAN 120 may select or determine to carry the multicast session on the BCH. Otherwise, if the expected data rate of the multicast session is not above a data rate threshold, then the RAN 120 may select or determine to carry the multicast session on the CCH. In another example, if channel conditions in one or more target sectors are poor, the CCH may be selected to increase the decoding success rate of the multicast messages. In another example, if the loading on the CCH is above a threshold in one or more target sectors, the RAN 120 may select the BCH to avoid overloading the CCH.

In another example, any combination of data rate, loading and/or AT-position criteria may be used to determine the channel type for the multicast transmission. Thus, in an example, if the number of multicast group members within a sector is high but the data rate for the multicast session is relatively low and the loading on the CCH is relatively low, the RAN 120 may apply a weighting function to the data rate, loading and sector co-location factors to make the determination of 510.

In yet another example, the determination of 510 can be RNC or subnet specific, such that different subnets can carry the multicast session on different channel types. For example, if conditions in a first subnet are better for the CCH and conditions in a second subnet are better for the BCH, the RNCs in charge of the different subnets need not synchronize the channel types, and can rather independently determine the best channel type to use on a per-subnet basis.

In another example, the determination of 510 can be specific to given groups of sectors within a particular subnet. For example, a first group or set of sectors within a subnet can be configured to carry a multicast session on the downlink CCH, while another group of sectors within the same subnet can be configured to support the multicast session on the downlink BCH.

Next, assume that the RAN 120 determines to transmit the multicast session on the CCH, and the process advances to 515. In 515, the RAN 120 configures the announce message to be transmitted to ATs 1 ... N to indicate that the announced multicast session will be carried on the CCH. For example, the RAN can attach a StorageBlobAssignment message to the announce message that includes a flag indicating the CCH for multicast transmission (e.g., in QChat, the StorageBlobAssignment message can contain an access control message (ACM) with a 'transmission mode' field set to indicate CCH or BCH, in an example). After the announce message is configured to indicate the CCH, the configured announce message is transmitted over the air interface 104, 520 (e.g., as a mobile-termination data over signaling (MT-DOS) message, or via a standard paging process). In an example, the transmission of the announce message can be based at least in part on a location table maintained at the RAN 120 for tracking multicast group member locations (e.g., MT-DOS announce in proximity to the ATs' expected locations, and standard paging announce in other sectors). In other words, an initial or estimated target sector set can be established to more efficiently announce the multicast session.

ATs 1 ... N receive the configured announce message, 525, and interpret the announce message as indicating a multicast transmission on the downlink CCH. In 530, each of ATs 1 ... N that are interested in participating in the announced multicast session requests a traffic channel (TCH), 530, from the RAN 120 (e.g., by sending a ConnectionRequest message). The RAN 120 assigns the requested TCHs to each requesting AT, 535. As will be described in greater detail below, the TCH assigned to ATs 1 ... N allows the RAN 120 to track the precise locations of ATs 1 ... N (e.g., during handoffs between sectors) based on messaging from ATs 1 ... N that is transmitted on a reverse link portion of the assigned TCH. Generally, because ATs 1 ... N are not necessarily floor-holders of the multicast session, the assigned reverse TCH is not used by ATs 1 ... N to send media for transmission to other multicast group members. However, ATs 1 ... N may transmit keep-alive packets so the RAN 120 does not de-allocate the TCHs, and also RouteUpdate messages for location tracking and/or to request handoff. On the other hand, because the TCH may be assigned for purposes of location tracking and/or handoff, it will be appreciated that the downlink portion of the TCH (F-TCH) may be substantially silent, unless the AT is engaged in a separate unicast session using the assigned TCH. Thus, the F-TCH does not necessarily consume forward link resources (i.e., timeslots), while the R-TCH permits location tracking of the AT by the RAN 120.

Next, in 540, after the TCH(s) are assigned in 535, one or more of ATs 1 ... N register for the multicast session, 415 (e.g., by transmitting a BCMCSFlowRegistration message) and also send an announce acknowledgment (ACK) that the RAN 120 forwards to the application server 170. It will be appreciated that once one or more of ATs 1 ... N attempt to register to the announced multicast session, the RAN 120 becomes aware that one or more listeners are in the sector and can begin forwarding multicast traffic on the downlink CCH, as described below with respect to 560 and 565. Also, in an example, the scheduling message or BOM need not be transmitted because each AT monitors the CCH continuously, and each AT need not be informed of a designated IM pair on the BCH because the multicast session is being carried on the CCH. In an example, while shown separately in FIG. 5A, the TCH request of 530 can be bundled with the announce ACK and multicast registration requests of 540 in at least one embodiment.

Based at least in part on the registrations received from ATs 1 . . . N, the RAN 120 determines the target sectors for the multicast session, 550. In an example, step 550 may generate an initial set of target sectors for the multicast session. In another example, step 550 may update an already existing set of target sectors that are determined prior to transmission of the announce message in 520 (e.g., based on a location table for tracking the multicast group members, as discussed above). As will be appreciated, the RAN 120 need not determine supporting sectors for the multicast session because the low data-rate of the CCH is easier for ATs to decode, and as such the overhead associated with the supporting sectors can be reduced or omitted because soft combining may not be necessary. FIG. 5B illustrates an example cluster (i.e., with only target sectors) that may be formed in 550 of FIG. 5A. As shown, FIG. 5B assumes that ATs A . . . G have registered for the multicast session, and that ATs A . . . G reside in target sectors T1 through T4. In contrast to FIG. 4B, in the example of FIG. 5B, the supporting sectors S1 through S12 need not be included in the cluster.

In 555, after the application server 170 receives a first announce ACK for the multicast session, the application server 170 begins forwarding multicast messages (e.g., multicast media messages, such as video, audio, text, etc.) to the RAN 120 via the BSN 165 over the BCA10 connection for transmission to one or more of ATs 1 . . . N. In 560, the RAN 120 receives the multicast messages over the BCA10 connection and schedules the multicast messages on the CCH. For example, the multicast messages can be scheduled on an asynchronous control channel capsule of a given control channel cycle of the CCH, as will now be described in greater detail with respect to FIG. 5C.

Figure 5B:
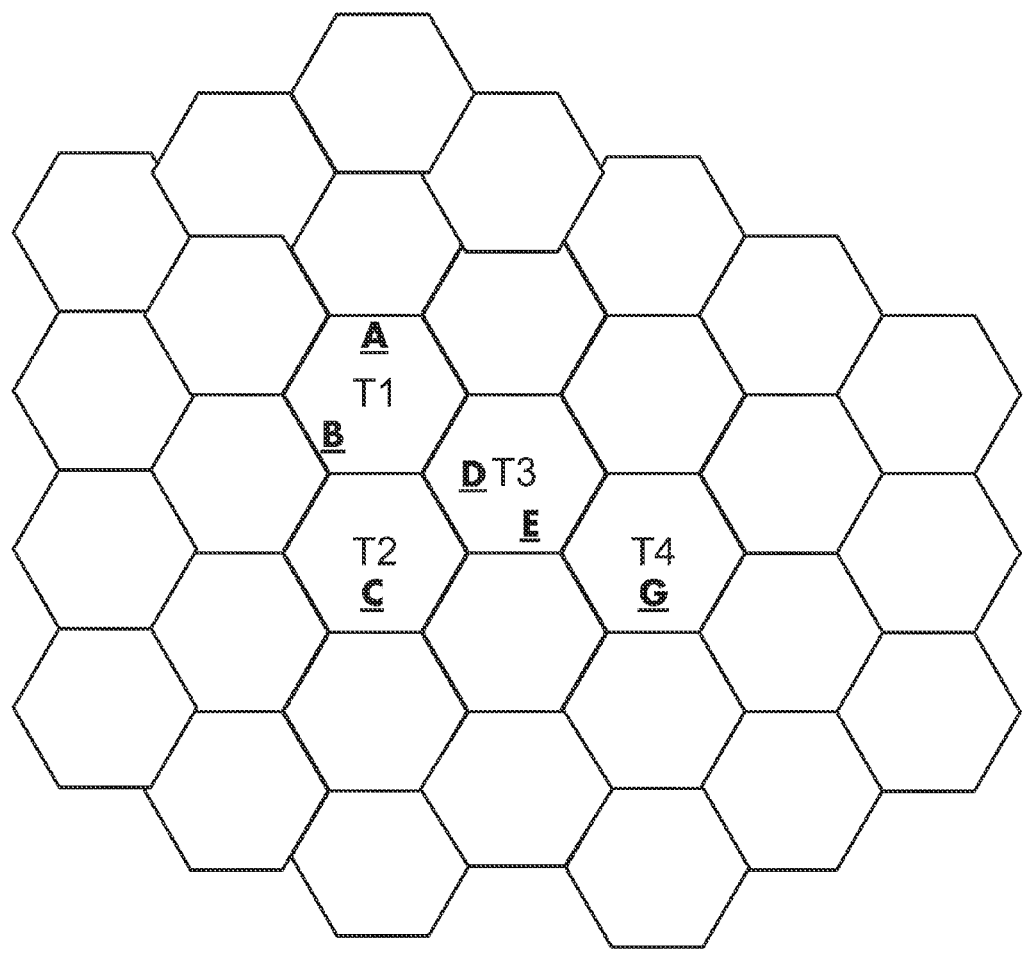
FIG. 5B illustrates a cluster formed during the process of FIG. 5A.
Figure 5C:
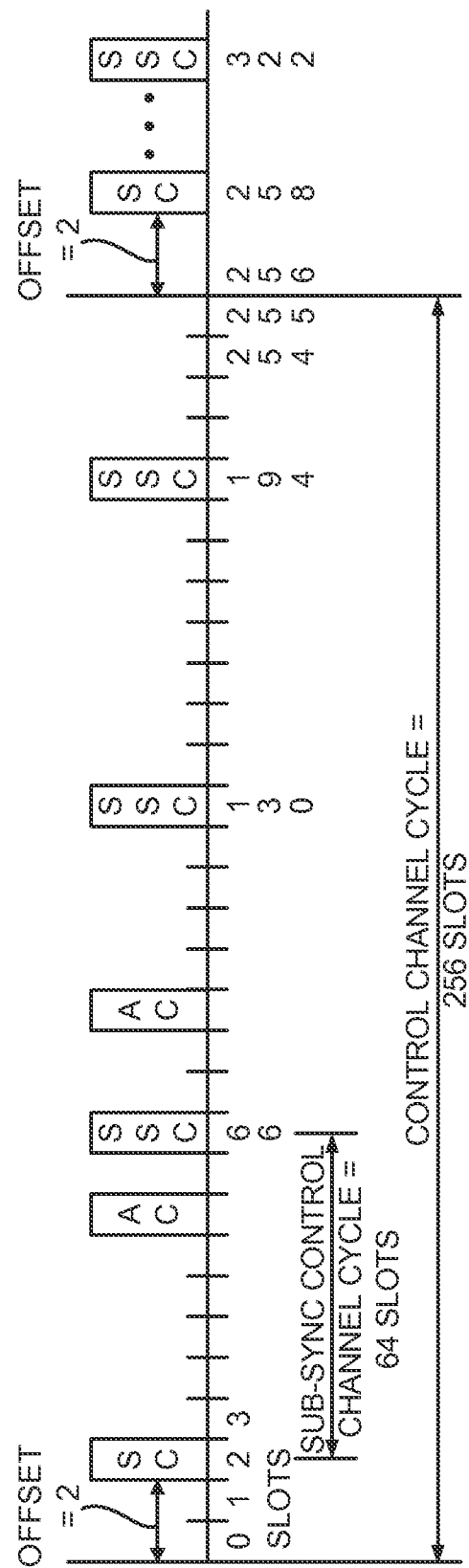
FIG. 5C illustrates an example of a control channel cycle of the downlink CCH.

FIG. 5C illustrates an example of a control channel cycle of the downlink CCH. Referring to FIG. 5C, each control channel cycle includes a total of 256 slots. Each control channel cycle includes a synchronous control channel capsule (SC), a plurality of asynchronous control channel capsules (ACs), and a plurality of sub-synchronous control channels (SSCs). One SC is regularly or periodically transmitted at a given timeslot for each control channel cycle having a period of 256 slots, whereas the ACs are transmitted at "random", or at non-synchronous timeslots, within the control channel cycle. The SC is first transmitted at a timeslot corresponding to "T mod 256=Offset", and then retransmitted at a timeslot corresponding to "T mod 4=Offset", where T denotes a system time and an Offset denotes a time value delayed from a fixed time, which are included in the control channel header. Each SC may include a plurality of control channel MAC layer packets, whereas each AC includes only one control channel MAC layer packet, in an example. As each MPT/BS124 periodically transmits one or more control channel MAC layer packets, interference (e.g., inter-cell interference) may occur if each MPT/BS124 transmits at the same time. Accordingly, a different offset is applied to the SC for each MPT/BS124 to avoid collisions. The MPT/BS may transmit as many as three SSC capsules within one control channel period or 256 slot cycle. Each SSC typically transmits only one control channel MAC layer packet. Assuming an offset value of 2, the SSCs are transmitted at time slots 66, 130 and 194. Unlike SCs and SSCs, ACs can start anytime within a control channel cycle. Therefore, messages sent on ACs do not need to wait for pre-defined time slots. Control channel capsules (e.g., SCs, ACs, SSCs, etc.) are generally well-known in the art within BCMCS systems, and as such a further description thereof has been omitted for the sake of brevity.

In an example, using the asynchronous control channel capsule can result in a reduction of the delay associated with BCH transmissions, which wait for the BOM-indicated IM pair, because the asynchronous control channel capsules occur more frequently (e.g., on each non synchronous or sub-synchronous control channel capsule). Next, in 565, the RAN 120 transmits the multicast messages to ATs 1 . . . N over the air interface 104 on the CCH as scheduled in 560, in each target sector. The ATs 1 . . . N monitor the CCH and received the multicast transmissions, 570.

As will be appreciated by one of ordinary skill in the art, the number of supporting sectors can be reduced and/or eliminated by using the CCH to carry the multicast flow for given multicast session. Below, cluster adjustments (e.g., the addition or removal of target/supporting sectors) are described with respect to both supporting sector and non-supporting sector embodiments of the invention.

Processes for adjusting clusters within a combination target and supporting sector scenario are described in detail within co-pending U.S. patent application Ser. No. 12/212,505, entitled "MULTICAST COMMUNICATIONS WITHIN A WIRELESS COMMUNICATIONS NETWORK", filed on Sep. 17, 2008, which has already been incorporated by reference above in its entirety. Accordingly, a brief description of cluster adjustments within a combination target and supporting sector scenario will be provided below to provide context, followed by a description of a CCH-based multicast within a target-sector only embodiment.

Figure 6A:
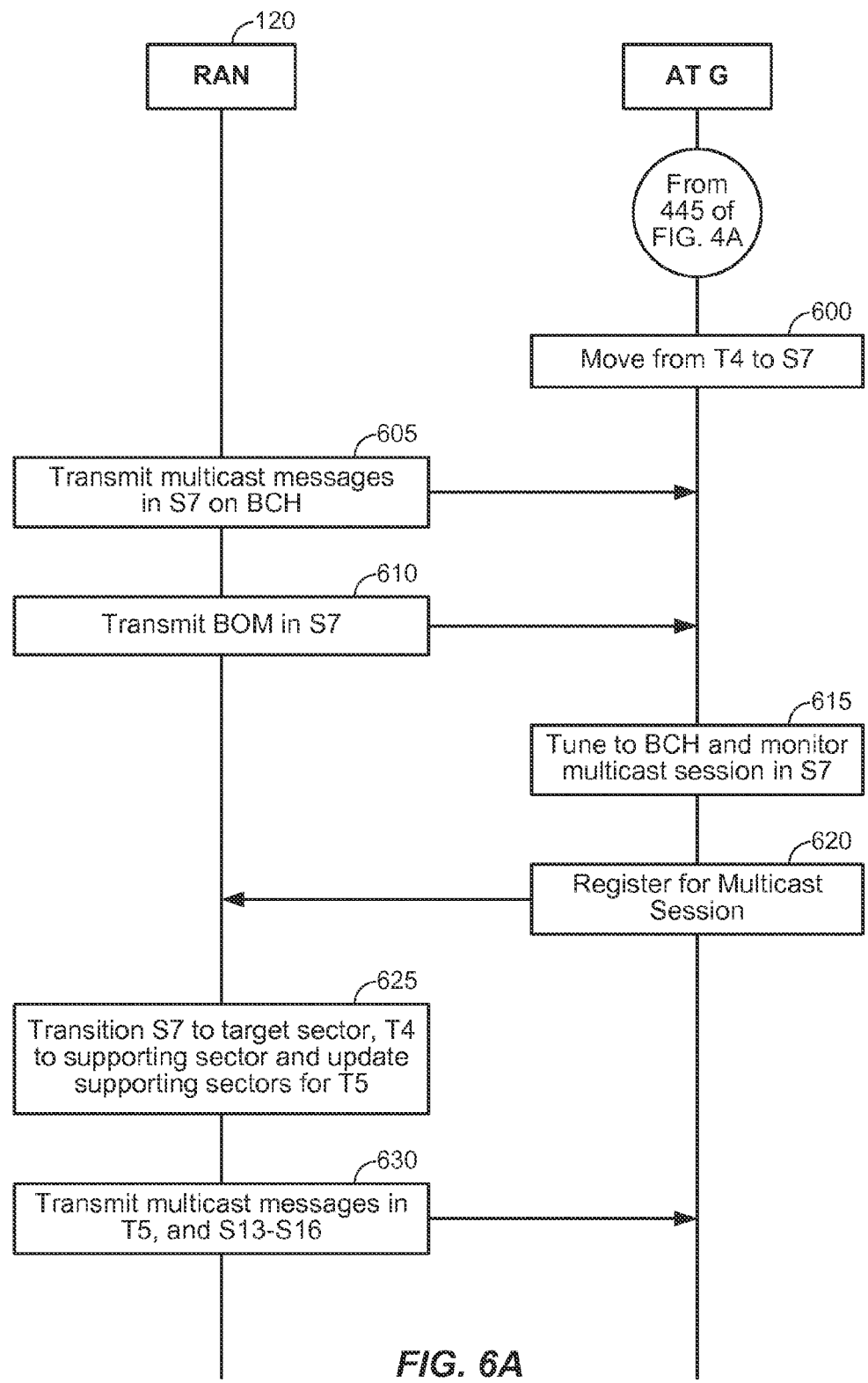
FIG. 6A illustrates a process for updating a cluster formed in accordance with FIG. 4A according to an embodiment of the present invention.
Figure 6B:
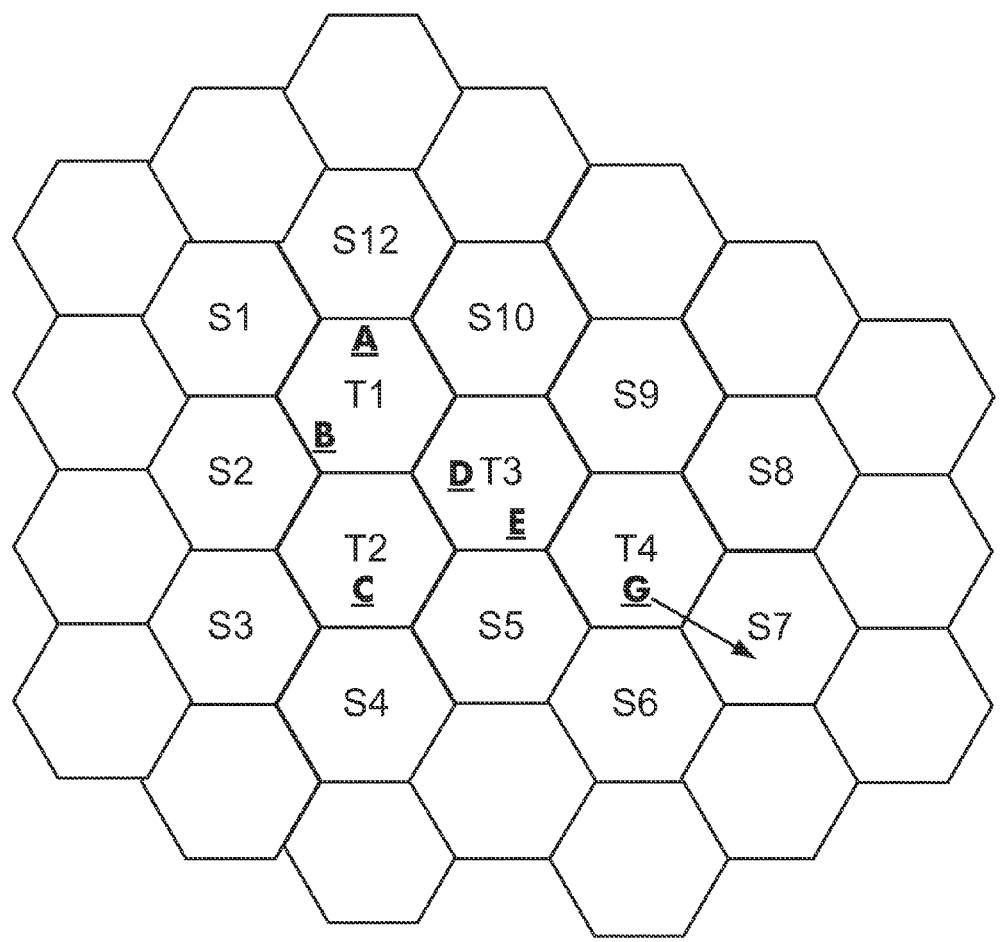
FIGS. 6B and 6C illustrates clusters at different stages of the update process of FIG. 6A.
Figure 6C:
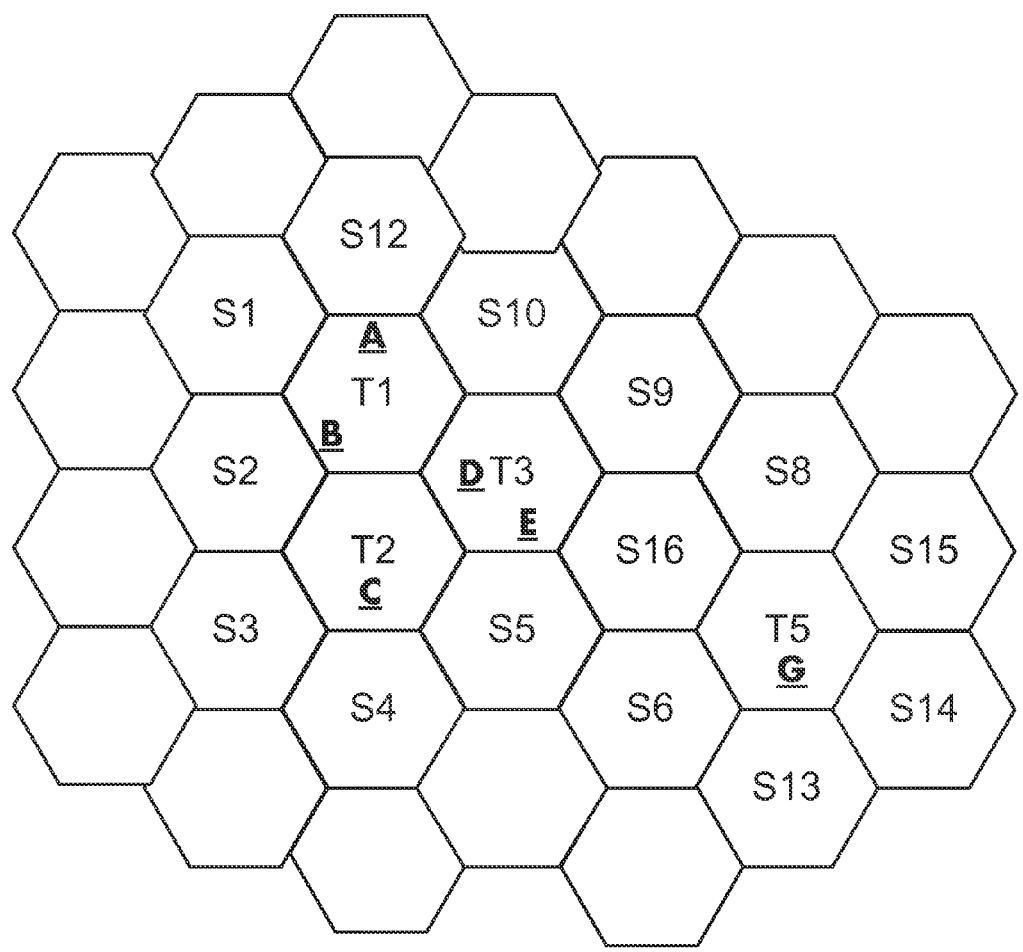

In an example, assume that the process of FIG. 4A is executed and that the cluster of FIG. 4B is active. With these assumptions, after 445 of FIG. 4A, the process advances to 600 of FIG. 6A. In 600, AT G moves from target sector T4 to adjacent supporting sector S7, as shown in FIG. 6B. As is characteristic of a supporting sector, the RAN 120 is already transmitting the multicast flow on the downlink BCH in supporting sector S7, 605. In 610, the RAN 120 transmits a periodic BOM, and AT G tunes to the BOM-indicated IM pair on the downlink BCH in sector S7, 615. The BOM transmitted is also configured (e.g., RFDB='1') to prompt AT G to respond with a registration message (e.g., a BCMCSFlowRegistration message), and AT G transmits the registration message, 620. The RAN 120 receives the registration message and updates the cluster based on the knowledge that AT G has left sector T4 and entered sector S7, 625. In particular, target sector T4 is removed from the set of target sectors (i.e., because no multicast group members are present), supporting sector S7 is transitioned to a target sector T5 and added to the set of target sectors, and the set of supporting sectors is updated to account for the loss of target sector T4 and addition of target sector T5. FIG. 6C illustrates an example of the updated cluster of 625. In 630, the RAN 120 transmits the multicast messages for the multicast session on the downlink BCH within the target and supporting sectors of the updated cluster.

In an example, assume that the process of FIG. 5A is executed and that the cluster of FIG. 5B is active. With these assumptions, after 570 of FIG. 5A, the process advances to

Figure 7A:
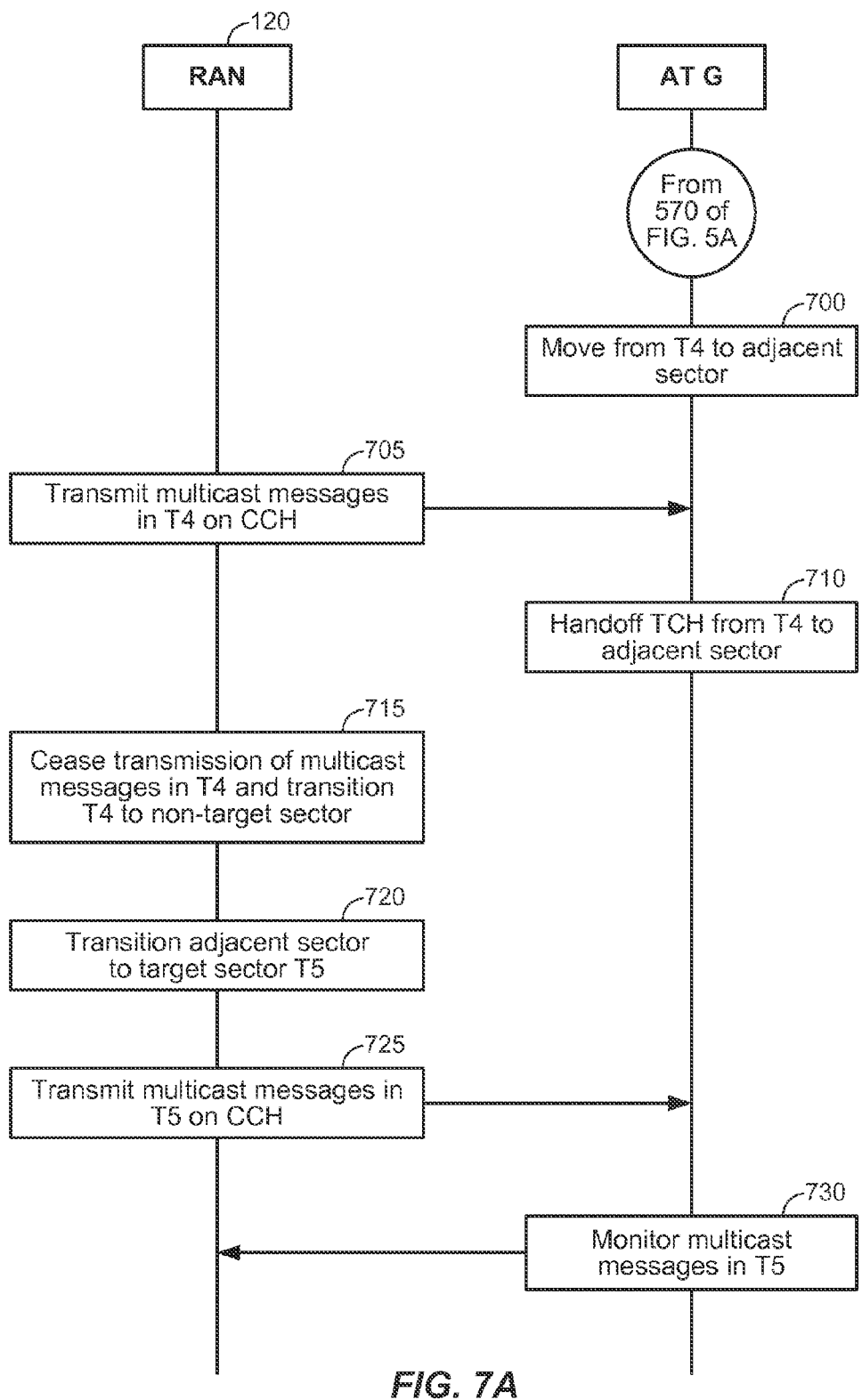
FIG. 7A illustrates a process for updating a cluster formed in accordance with FIG. 5A according to an embodiment of the present invention.
Figure 7B:
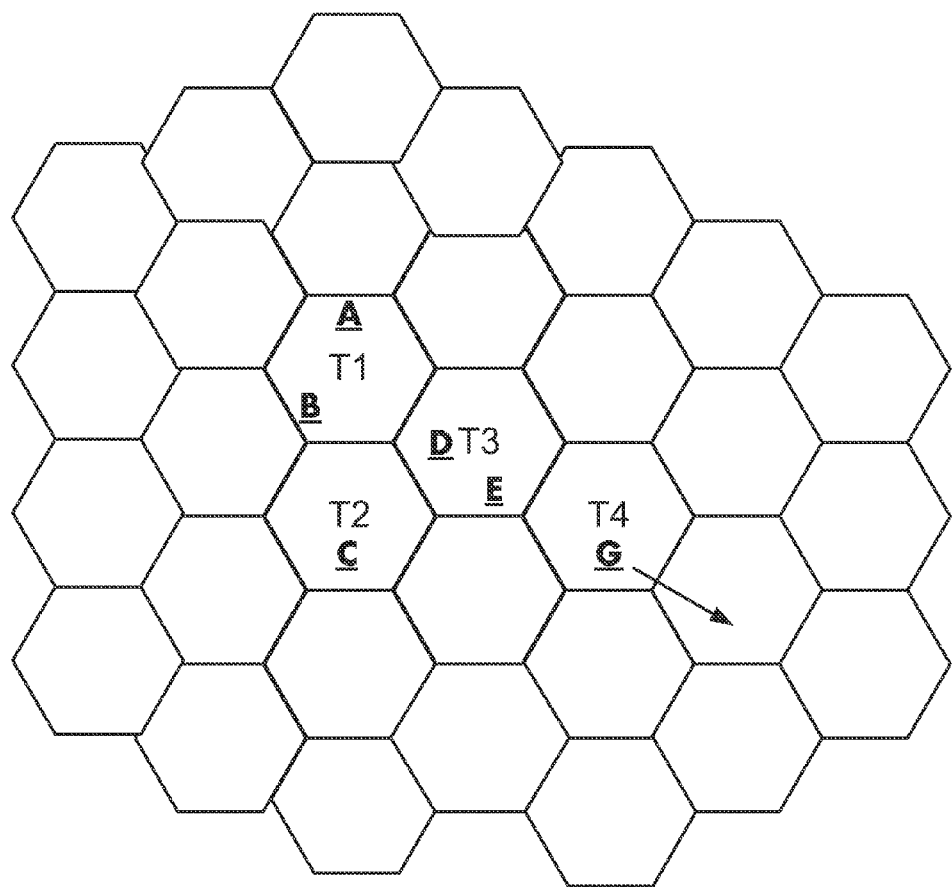
FIGS. 7B and 7C illustrate clusters at different stages of the update process of FIG. 7.
Figure 7C:
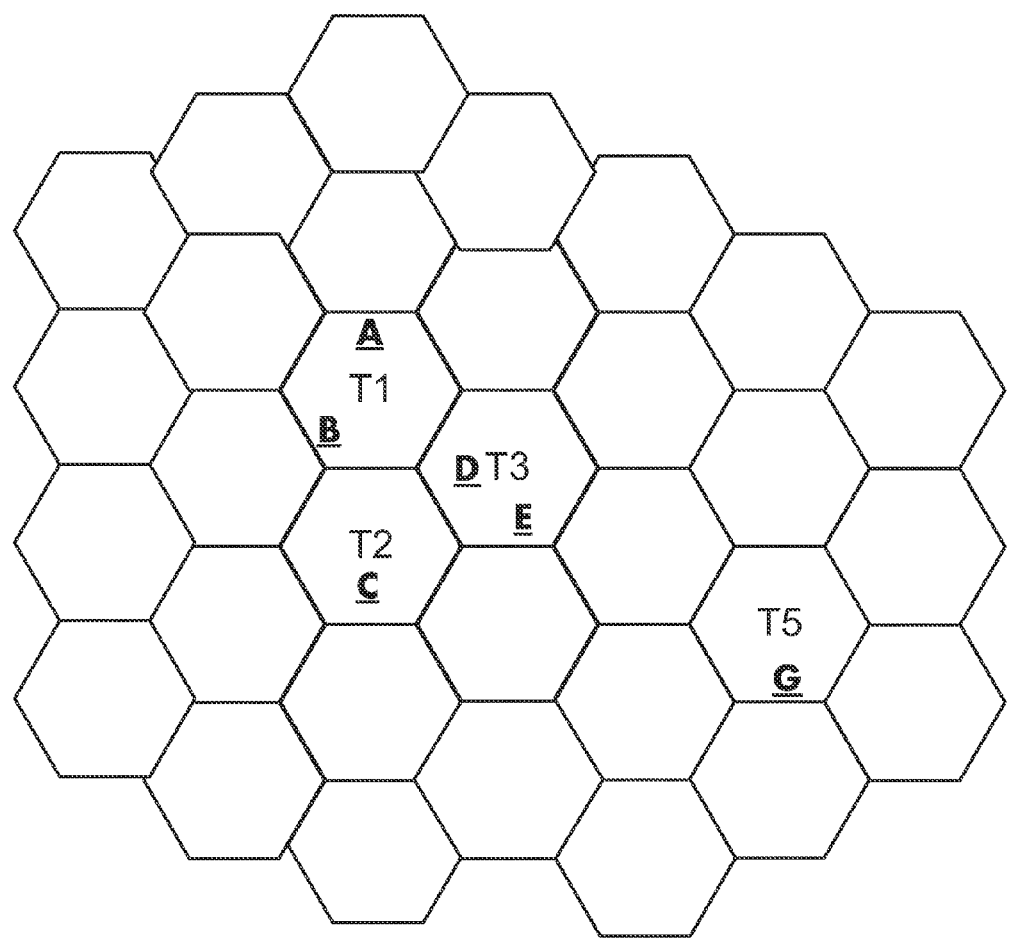

700 of FIG. 7A. In 700, AT G begins moving from target sector T4 to an adjacent non-target sector, as shown in FIG. 7B. Because the adjacent sector is a non-target sector and this example cluster does not include supporting sectors, AT G's new cluster is not transmitting multicast messages for the multicast session. In 705, the RAN 120 continues to transmit multicast messages within sector T4. In 710, AT G is handed off from target sector T4 to the new sector, which is triggered by the RouteUpdate message sent by AT G on the assigned R-TCH to the RAN 120. Handoff (e.g., soft handoff, hard handoff, etc.) is well known in the art. Here, the inter-sector handoff of AT G is possible because AT G was previously assigned a TCH in 535 of FIG. 5A. Because the RAN 120 has handed off AT G from target sector T4 to the new sector, the RAN 120 is aware of AT G's new location, and can update a location table that tracks AT locations with AT G's new position. Further, the RAN 120 updates the cluster by ceasing transmission of multicast messages in target sector T4 and transitioning target sector T4 to a non-target sector (e.g., because no multicast group members remain in T4 after AT G leaves), 715, and transitions AT G's new sector to target sector T5. FIG. 7C illustrates an example of the updated cluster of 715/720 of FIG. 7A. In 725, the RAN 120 transmits the multicast messages for the multicast session on the downlink CCH within the target sectors of the updated cluster, which are monitored by AT G, 730.

In another embodiment of the invention, while not described above, it will be appreciated that the determining step of 510 of FIG. 5A may also be performed during an active multicast session, and not merely in advance of an announce message transmission. Thus, the RAN 120 can toggle a multicast session back and forth between the BCH and CCH based on current operating parameters, in an example (e.g., if the number of multicast group members rises above or falls below a threshold during operation, etc.). Because there is overhead associated with this type of dynamic switching, the thresholds associated with an active-session channel switch may be different than the thresholds associated with 510 of FIG. 5A.

Accordingly, as will be appreciated by one of ordinary skill in the art in view of the embodiments described above, a spectral efficiency of the wireless communications system 100 can be increased by transmitting a multicast flow primarily within target sectors on a low data-rate shared downlink channel, such as the downlink CCH. This allows fewer (e.g., zero) supporting sectors to be deployed (e.g., within a particular subnet, within all subnets carrying the session, within a subnet portion constituting a given group of sectors within the subnet while another subnet portion of the same subnet includes supporting sectors, etc.) that carry the multicast flow even though no target ATs are present within the supporting sectors. As discussed above, the RAN 120 can track the locations of ATs based on the assigned TCH, such that ATs do not drop the multicast session when handing off to sectors that are not yet carrying the multicast flow.

Above, embodiments are generally directed to supporting a multicast session in one or more subnets on a downlink control channel instead of a downlink broadcast channel. In general, the downlink control channel transmits at a lower-data rate than the downlink broadcast channel, and as such soft-combining is less likely to be necessary as compared to the downlink broadcast channel. However, in another embodiment, the multicast session can be supported on a downlink shared channel that can correspond to either the control channel or the broadcast channel. In this embodiment, if the downlink shared channel corresponds to the downlink broadcast channel, soft-combining via one or more supporting sectors can still be omitted so long as a traffic channel is assigned to each non-floorholder AT for location tracking during the multicast session (e.g., so the session is not dropped if an AT hands off to a non-target sector). While an error rate of the downlink BCH embodiment without supporting sectors may be higher than an error rate if the session were supported on the downlink CCH, it will also be appreciated that carrying the session on the downlink BCH reduces the load on the downlink CCH.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of multicasting within a wireless communications system, comprising:
    determining to transmit multicast messages associated with an announced multicast session on a downlink shared channel;
    receiving, from one or more access terminals, a multicast session registration message to request registration to the announced multicast session and a traffic channel request to request a given traffic channel;
    assigning a traffic channel to each of the one or more access terminals;
    maintaining the one or more traffic channel assignments to the one or more access terminals throughout the announced multicast session while transmitting the multicast messages to the one or more access terminals on the downlink shared channel, wherein the maintaining maintains the one or more traffic channel assignments irrespective of whether one or more forward links of the one or more assigned traffic channels carry media for the announced multicast session during the announced multicast session;
    tracking a location of the one or more access terminals during the announced multicast session based on the one or more assigned traffic channels; and
    updating a set of sectors supporting the announced multicast session via the downlink shared channel during the announced multicast session based on the location tracking.

2. The method of claim 1, wherein the downlink shared channel corresponds to a downlink control channel.

3. The method of claim 2, wherein the the multicast messages are transmitted within one or more asynchronous control capsules in one or more control channel cycles of the downlink control channel.

4. The method of claim 1, wherein the multicast messages are only transmitted within one or more sectors that are expected to include one or more of a plurality of multicast group members participating in the announced multicast session, such that one or more other sectors that do not include at least one of the plurality of multicast group members do not transmit the multicast messages.

5. The method of claim 1, wherein the determining, assigning and maintaining steps are performed on a per-subnet basis.

6. The method of claim 5,
    wherein, for a first subnet, the multicast messages are transmitted within one or more sectors that are expected to include one or more of a plurality of multicast group members participating in the announced multicast session, such that one or more other sectors that do not include at least one of the plurality of multicast group members do not transmit the multicast messages, and
    wherein a second subnet transmits the multicast messages on a downlink broadcast channel within one or more additional sectors that are expected to include any of the plurality of multicast group members and also within at least one sector that does not include any of the plurality of multicast group members.

7. The method of claim 1, wherein the determining, assigning and maintaining steps are performed for a first group of sectors within a given subnet, further comprising:
    transmitting the multicast messages within a second group of sectors that is different from the first group of sectors within the given subnet on a downlink broadcast channel that is different from the downlink shared channel.

8. The method of claim 1, wherein each assigned traffic channel includes a forward link traffic channel and a reverse link traffic channel.

9. The method of claim 8,
    wherein the tracking is based on the one or more assigned reverse link traffic channels.

10. The method of claim 9, further comprising:
    ceasing transmission of the multicast messages on the downlink shared channel in a first sector if the tracking step determines that at least one of the one or more access terminals hands off from the first sector to a second sector and a number of the one or more access terminals remaining in the first sector after the handoff is less than a threshold.

11. The method of claim 9, further comprising:
    beginning transmission of the multicast messages on the downlink shared channel in a second sector if the tracking step determines that at least one of the one or more access terminals hands off from a first sector to the second sector and a number of the one or more access terminals present in the second sector before the handoff is less than a threshold.

12. The method of claim 8, further comprising:
    associating a given traffic channel request from a given access terminal with the multicast session registration message from the given access terminal.

13. A method of operating an access terminal within a wireless communications system, comprising:
    receiving an announce message announcing a multicast session;

sending a traffic channel request to request a traffic channel in response to the received announce message;
receiving a traffic channel assignment in response to the traffic channel request;
sending a registration request to register to the announced multicast session;
monitoring a downlink shared channel for multicast messages associated with the announced multicast session throughout the announced multicast session;
maintaining at least one traffic channel that is assigned by the traffic channel assignment throughout the announced multicast session, wherein the maintaining maintains the at least one traffic channel irrespective of whether a forward link of the at least one traffic channel carries media for the announced multicast session during the announced multicast session; and
transmitting one or more messages on a reverse link of the at least one traffic channel to permit an access network to track a location of the access terminal during the announced multicast session.

14. The method of claim 13, wherein the downlink shared channel corresponds to a downlink control channel.

15. The method of claim 13, wherein the announce message is configured to indicate that the announced multicast session is supported on the downlink shared channel.

16. The method of claim 15, wherein the announce message is configured to indicate that the announced multicast session is supported on the downlink shared channel based on the announce message being sent along with a supplemental message indicating the downlink shared channel.

17. The method of claim 13, further comprising:
handing off from a first sector to a second sector; and
continuing to monitor the downlink shared channel, after the handoff in the second sector, for multicast messages associated with the announced multicast session.

18. A method of multicasting within a wireless communications system, comprising:
receiving an announce message announcing a multicast session;
sending a traffic channel request to request a traffic channel in response to the received announce message;
receiving a traffic channel assignment in response to the traffic channel request;
sending a registration request to register to the announced multicast session; and
monitoring a downlink shared channel for multicast messages associated with the announced multicast session;
wherein the traffic channel assignment assigns a forward link traffic channel and a reverse link traffic channel to an access terminal,
wherein the forward link traffic channel is silent if the announced multicast session is active and a separate unicast session with the access terminal is not established, and
wherein the access terminal transmits, on the reverse link traffic channel, messaging sufficient to maintain assignment of the forward and reverse link traffic channels and to permit an access network to track a location of the access terminal.

19. An access network within a wireless communications system, comprising:
means for determining to transmit multicast messages associated with an announced multicast session on a downlink shared channel;
means for receiving, from one or more access terminals, a multicast session registration message to request registration to the announced multicast session and a traffic channel request to request a given traffic channel;
means for assigning a traffic channel to each of the one or more access terminals;
means for maintaining the traffic channel assignment to the one or more access terminals throughout the announced multicast session while transmitting the multicast messages to the one or more access terminals on the downlink shared channel, wherein the means for maintaining maintains the one or more traffic channel assignments irrespective of whether one or more forward links of the one or more assigned traffic channels carry media for the announced multicast session during the announced multicast session;
means for tracking a location of the one or more access terminals during the announced multicast session based on the one or more assigned traffic channels; and
means for updating a set of sectors supporting the announced multicast session via the downlink shared channel during the announced multicast session based on the location tracking.

20. An access terminal within a wireless communications system, comprising:
means for receiving an announce message announcing a multicast session;
means for sending a traffic channel request to request a traffic channel in response to the received announce message;
means for receiving a traffic channel assignment in response to the traffic channel request;
means for sending a registration request to register to the announced multicast session;
means for monitoring a downlink shared channel for multicast messages associated with the announced multicast session throughout the announced multicast session;
means for maintaining at least one traffic channel that is assigned by the traffic channel assignment throughout the announced multicast session, wherein the maintaining maintains the at least one traffic channel irrespective of whether a forward link of the at least one traffic channel carries media for the announced multicast session during the announced multicast session; and
means for transmitting one or more messages on a reverse link of the at least one traffic channel to permit an access network to track a location of the access terminal during the announced multicast session.

21. An access network within a wireless communications system, comprising:
logic configured to determine to transmit multicast messages associated with an announced multicast session on a downlink shared channel;
logic configured to receive, from one or more access terminals, a multicast session registration message to request registration to the announced multicast session and a traffic channel request to request a given traffic channel;
logic configured to assign a traffic channel to each of the one or more access terminals;
logic configured to maintain the traffic channel assignment to the one or more access terminals throughout the announced multicast session while transmitting the multicast messages to the one or more access terminals on the downlink shared channel, wherein the logic configured to maintain maintains the one or more traffic channel assignments irrespective of whether one or more forward links of the one or more assigned traffic channels carry media for the announced multicast session during the announced multicast session;

logic configured to track a location of the one or more access terminals during the announced multicast session based on the one or more assigned traffic channels; and logic configured to update a set of sectors supporting the announced multicast session via the downlink shared channel during the announced multicast session based on the location tracking.

22. An access terminal within a wireless communications system, comprising:

logic configured to receive an announce message announcing a multicast session;

logic configured to send a traffic channel request to request a traffic channel in response to the received announce message;

logic configured to receive a traffic channel assignment in response to the traffic channel request;

logic configured to send a registration request to register to the announced multicast session;

logic configured to monitor a downlink shared channel for multicast messages associated with the announced multicast session throughout the announced multicast session;

logic configured to maintain at least one traffic channel that is assigned by the traffic channel assignment throughout the announced multicast session, wherein the logic configured to maintain maintains the at least one traffic channel irrespective of whether a forward link of the at least one traffic channel carries media for the announced multicast session during the announced multicast session; and logic configured to transmit one or more messages on a reverse link of the at least one traffic channel to permit an access network to track a location of the access terminal during the announced multicast session.

23. A non-transitory computer-readable storage medium comprising instructions encoded thereon, which, when executed by an access network within a wireless communications system, cause the access network to perform operations, the instructions comprising:

program code to determine to transmit multicast messages associated with an announced multicast session on a downlink shared channel;

program code to receive, from one or more access terminals, a multicast session registration message to request registration to the announced multicast session and a traffic channel request to request a given traffic channel;

program code to assign a traffic channel to each of the one or more access terminals; and program code to maintain the traffic channel assignment to the one or more access terminals throughout the announced multicast session while transmitting the multicast messages to the one or more access terminals on the downlink shared channel, wherein the program code to maintain maintains the one or more traffic channel assignments irrespective of whether one or more forward links of the one or more assigned traffic channels carry media for the announced multicast session during the announced multicast session;

program code to track a location of the one or more access terminals during the announced multicast session based on the one or more assigned traffic channels; and program code to update a set of sectors supporting the announced multicast session via the downlink shared channel during the announced multicast session based on the location tracking.

24. A non-transitory computer-readable storage medium comprising instructions encoded thereon, which, when executed by an access terminal within a wireless communications system, cause the access terminal to perform operations, the instructions comprising:

program code to receive an announce message announcing a multicast session;

program code to send a traffic channel request to request a traffic channel in response to the received announce message;

program code to receive a traffic channel assignment in response to the traffic channel request;

program code to send a registration request to register to the announced multicast session; and program code to monitor a downlink shared channel for multicast messages associated with the announced multicast session throughout the announced multicast session; and program code to maintain at least one traffic channel that is assigned by the traffic channel assignment throughout the announced multicast session, wherein the program code to maintain maintains the at least one traffic channel irrespective of whether a forward link of the at least one traffic channel carries media for the announced multicast session during the announced multicast session; and program code to transmit one or more messages on a reverse link of the at least one traffic channel to permit an access network to track a location of the access terminal during the announced multicast session.

25. A method of multicasting within a wireless communications system, comprising:

determining to transmit multicast messages associated with an announced multicast session on a downlink shared channel in a first group of sectors;

determining to transmit the multicast messages associated with the announced multicast session on a downlink broadcast channel in a second group of sectors, the downlink shared channel being different than the downlink broadcast channel and the first group of sectors being different than the second group of sectors;

receiving, from one or more access terminals in the first group of sectors, a multicast session registration message to request registration to the announced multicast session and a traffic channel request to request a given traffic channel;

assigning a traffic channel to each of the one or more access terminals in the first group of sectors;

transmitting the multicast messages to the one or more access terminals on the downlink shared channel in the first group of sectors; and transmitting the multicast messages to one or more other access terminals on the downlink broadcast channel in the second group of sectors.

26. The method of claim 25, wherein the first group of sectors belong to a first subnet and the second group of sectors belong to a second subnet that is different from the first subnet.

27. The method of claim 25, wherein the first and second groups of sectors each belong to a given subnet.

28. The method of claim 1, wherein the announced multicast session is announced on the downlink shared channel, and wherein the assigning assigns the one or more assigned traffic channels the one or more access terminals in response to the announced multicast session being announced on the downlink shared channel.

29. The method of claim 1,
wherein the one or more forward links of the one or more assigned traffic channels do not carry any media for the announced multicast session during the announced multicast session, and
wherein the maintaining maintains the traffic channel despite the one or more forward links not carrying any media to permit the location tracking.

\* \* \* \* \*